(12) United States Patent
Song et al.

(10) Patent No.: US 12,061,731 B2
(45) Date of Patent: Aug. 13, 2024

(54) METHOD AND APPARATUS FOR REPLACING SECURITY KEY IN MACHINE TO MACHINE SYSTEM

(71) Applicants: Hyundai Motor Company, Seoul (KR); Kia Motors Corporation, Seoul (KR); Industry Academy Cooperation Foundation of Sejong University, Seoul (KR)

(72) Inventors: Jae Seung Song, Seoul (KR); Min Byeong Lee, Gyeonggi-do (KR); Jongmyung Park, Gyeonggi-do (KR)

(73) Assignees: Hyundai Motor Company, Seoul (KR); Kia Motors Corporation, Seoul (KR); Industry Academy Cooperation Foundation of Sejong University, Seoul (KR)

(*) Notice: Subject to any disclaimer, the term of this patent is extended or adjusted under 35 U.S.C. 154(b) by 0 days.

(21) Appl. No.: 17/571,998

(22) Filed: Jan. 10, 2022

(65) Prior Publication Data

US 2022/0222382 A1  Jul. 14, 2022

Related U.S. Application Data

(60) Provisional application No. 63/137,233, filed on Jan. 14, 2021.

(51) Int. Cl.
*G06F 21/73* (2013.01)
(52) U.S. Cl.
CPC .................................. *G06F 21/73* (2013.01)
(58) Field of Classification Search
CPC ........................................................ G06F 21/73

USPC ............................................................. 726/34
See application file for complete search history.

(56) References Cited

U.S. PATENT DOCUMENTS

| 10,164,775 | B2* | 12/2018 | Park | H04W 4/80 |
| 11,616,646 | B2* | 3/2023 | Hansen | H04L 9/0891 |
| | | | | 380/286 |
| 2010/0106367 | A1* | 4/2010 | Kolletzki | H04N 21/44222 |
| | | | | 715/825 |
| 2010/0106967 | A1* | 4/2010 | Johansson | H04W 4/60 |
| | | | | 713/168 |

(Continued)

FOREIGN PATENT DOCUMENTS

EP       2536189 A1    12/2012

OTHER PUBLICATIONS

OneM2M Technical Report, "oneM2M-TR-0008-Security-V1.0.0", dated Apr. 10, 2014, document No. TR 0008, 46 pages.

(Continued)

*Primary Examiner* — Dereena T Cattungal
(74) *Attorney, Agent, or Firm* — Fox Rothschild LLP

(57) ABSTRACT

A security key is configured to be replaced when a device is replaced in a machine-to-machine (M2M) system. A method for operating a first device may include: receiving a first message including first information associated with security key replacement from a second device or a third device; receiving a third message including second information associated with security key replacement, which is generated based on a second message including a security key replacement indication, from the second device or the third device; and replacing the security key.

13 Claims, 8 Drawing Sheets

(56) References Cited

U.S. PATENT DOCUMENTS

| | | | |
|---|---|---|---|
| 2013/0185560 A1* | 7/2013 | Eld | H04L 9/12 713/168 |
| 2014/0089669 A1* | 3/2014 | Papillon | H04L 9/0844 713/171 |
| 2014/0317707 A1* | 10/2014 | Kim | H04L 67/104 726/6 |
| 2017/0295491 A1* | 10/2017 | Gehrmann | H04W 4/70 |
| 2019/0312724 A1* | 10/2019 | Mityagin | H04L 63/068 |
| 2021/0136157 A1* | 5/2021 | Kauppila | H04L 67/146 |
| 2021/0266326 A1* | 8/2021 | Chen | H04L 67/52 |
| 2022/0353060 A1* | 11/2022 | Saarnivala | H04L 9/12 |

OTHER PUBLICATIONS

OneM2M Technical Specification, "Security Solutions", dated Aug. 12, 2020, document No. TS-0003-V4.3.0, 270 pages.

* cited by examiner

METHOD AND APPARATUS FOR REPLACING SECURITY KEY IN MACHINE TO MACHINE SYSTEM

CROSS REFERENCE TO RELATED APPLICATION

The present application claims the benefit of U.S. provisional application No. 63/137,233, filed Jan. 14, 2021, the entire contents of which are incorporated herein by reference.

BACKGROUND

(a) Technical Field

The present disclosure relates to a machine-to-machine (M2M) system, more particularly, to a method and apparatus for replacing a security key used in an Internet of Things (IoT) device in an M2M system.

(b) Description of the Related Art

Recently, the use of Machine-to-Machine (M2M) systems has become more widespread. An M2M communication may refer to a communication performed between machines without human intervention. M2M may encompass Machine Type Communication (MTC), Internet of Things (IoT) or Device-to-Device (D2D). In the following description, the term "M2M" is uniformly used for convenience of explanation, but the present disclosure is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

The present disclosure is directed to provide a method and apparatus for replacing a security key when a device is replaced in a machine-to-machine (M2M) system.

The present disclosure is directed to provide a method and apparatus for safely managing a security key when a device is replaced in an M2M system.

The present disclosure is directed to provide a method and apparatus for providing information on a security key of a device in an M2M system.

The present disclosure is directed to provide a method and apparatus for efficiently managing information on a security key of a device in an M2M system.

The present disclosure is directed to provide a method and apparatus for maximizing security of an Internet of Things (IoT) device by safely replacing a security key in an M2M system.

According to an embodiment of the present disclosure, a method for operating a first device in a machine-to-machine (M2M) system may include: receiving, from at least one of a second device or a third device, a first message including first information associated with security key replacement; receiving, from at least one of the second device or the third device, a third message including second information associated with security key replacement, which is generated based on a second message including a security key replacement indication; and replacing the security key.

According to an embodiment of the present disclosure, a method for operating a second device in a machine-to-machine (M2M) system may include: transmitting, to at least one of a first device or a third device, a first message including first information associated with security key replacement; and transmitting, to at least one of the first device or the third device, a second message including a security key replacement indication.

According to an embodiment of the present disclosure, a method for operating a third device in a machine-to-machine (M2M) system may include: receiving, from at least one of a first device or a second device, a second message including a security key replacement indication; and transmitting, to at least one of the first device or the second device, a third message including second information associated with security key replacement, which is generated based on the security key replacement indication.

According to an embodiment of the present disclosure, a first device in a machine-to-machine (M2M) system may include a transceiver and a processor coupled with the transceiver. The processor may be configured to receive a second message including a security key replacement indication from at least one of a first device or a second device and to transmit a third message including second information associated with security key replacement, which is generated based on the security key replacement indication, to at least one of the first device or the second device.

According to an embodiment of the present disclosure, a second device in a machine-to-machine (M2M) system may include a transceiver and a processor coupled with the transceiver. The processor may be configured to transmit a first message including first information associated with security key replacement to at least one of a first device or a third device and to transmit a second message including a security key replacement indication to at least one of the first device or the third device.

According to an embodiment of the present disclosure, a third device in a machine-to-machine (M2M) system may include a transceiver and a processor coupled with the transceiver.

The processor may be configured to receive a second message including a security key replacement indication from at least one of a first device or a second device and to transmit a third message including second information associated with security key replacement, which is generated based on the security key replacement indication, to at least one of the first device or the second device.

According to the present disclosure, information on a security key may be efficiently managed when a device is replaced in a machine-to-machine (M2M) system.

According to the present disclosure, the security of an Internet of Things (IoT) device may be maximized by safely replacing a security key in an M2M system.

Effects obtained in the present disclosure are not limited to the above-mentioned effects, and other effects not mentioned above may be clearly understood by those skilled in the art from the following description.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Figure 1:
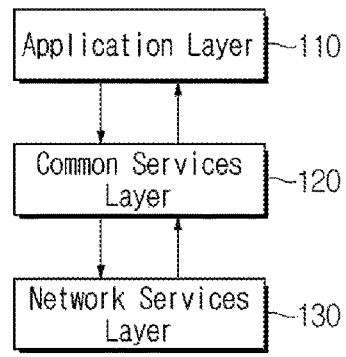
FIG. 1 illustrates a layered structure of a machine-to-machine (M2M) system according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In the present disclosure, when a component is referred to as being "linked", "coupled", or "connected" to another component, it is understood that not only a direct connection relationship but also an indirect connection relationship through an intermediate component may also be included.

In the present disclosure, components that are distinguished from each other are intended to clearly illustrate each feature. However, it does not necessarily mean that the components are separate. In other words, a plurality of components may be integrated into one hardware or software unit, or a single component may be distributed into a plurality of hardware or software units. Thus, unless otherwise noted, such integrated or distributed embodiments are also included within the scope of the present disclosure.

The present disclosure relates to a method and apparatus for replacing a security key of a device in a machine-to-machine (M2M) system. Particularly, the present disclosure describes a technique for managing information associated with security key replacement of an Internet of Things (IoT) device in an M2M system.

Further, oneM2M is a de facto standards organization that was founded to develop a communal IoT service platform sharing and integrating application service infrastructure (platform) environments beyond fragmented service platform development structures limited to separate industries like energy, transportation, national defense and public service, where oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of a Machine-to-Machine (M2M) system according to the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application or a controlling application. In other words, an application layer may a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that are grouped into CSFs according to functions. A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M). The network services layer 130 may provide the common services layer 120 with services such as device management, location service and device triggering. Herein, an entity operating based on the network layer 120 may be a network service entity (NSE).

Figure 2:
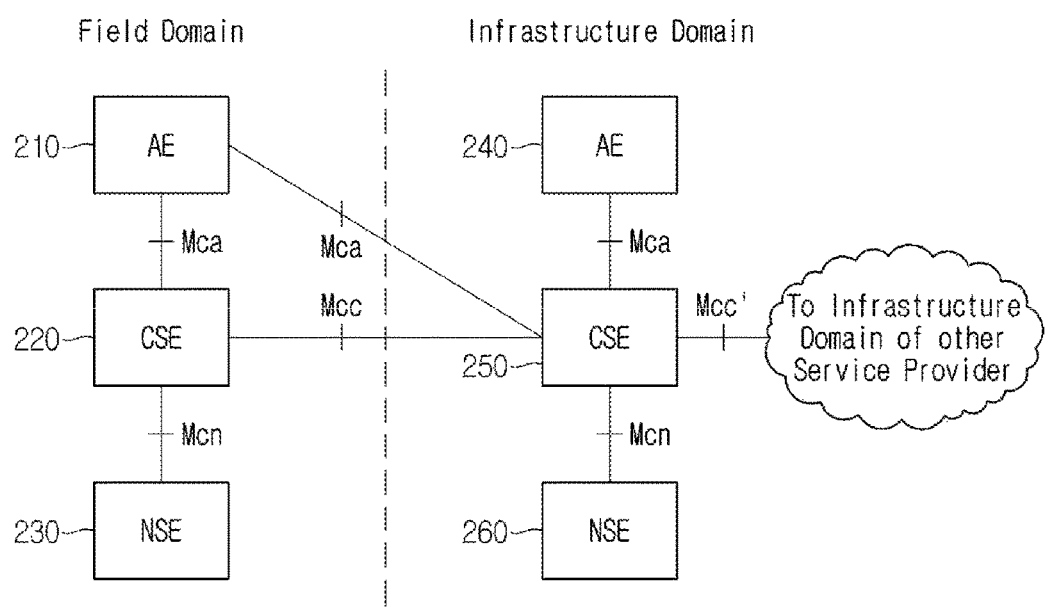
FIG. 2 illustrates a reference point in an M2M system according to the present disclosure.

FIG. 2 is a view illustrating reference points in an M2M system according to the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
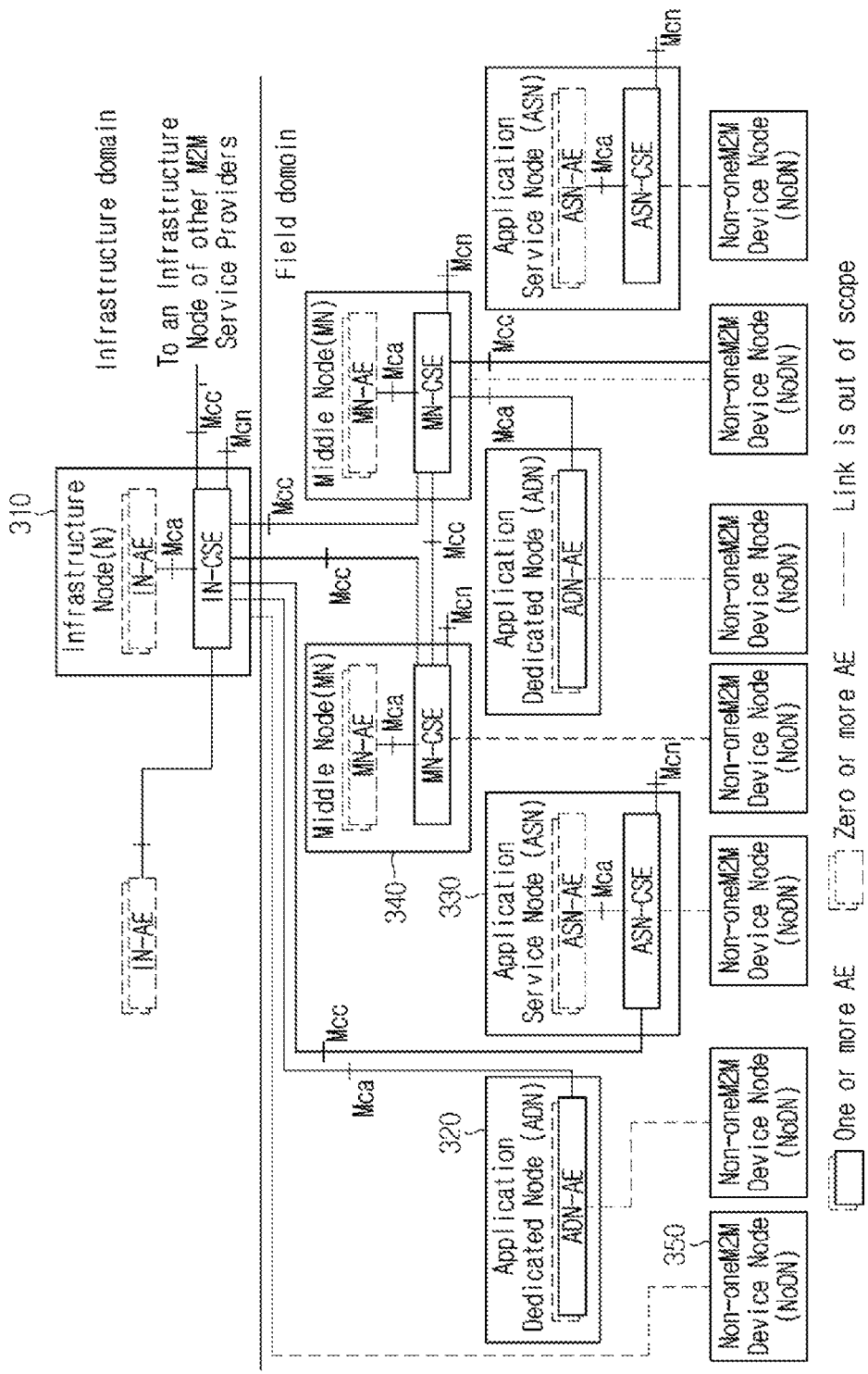
FIG. 3 illustrates each node in an M2M system according to the present disclosure.

FIG. 3 is a view illustrating each node in an M2M system according to the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) is a node that does not include M2M entities. It may be a node that performs management or collaboration together with an M2M system.

Figure 4:
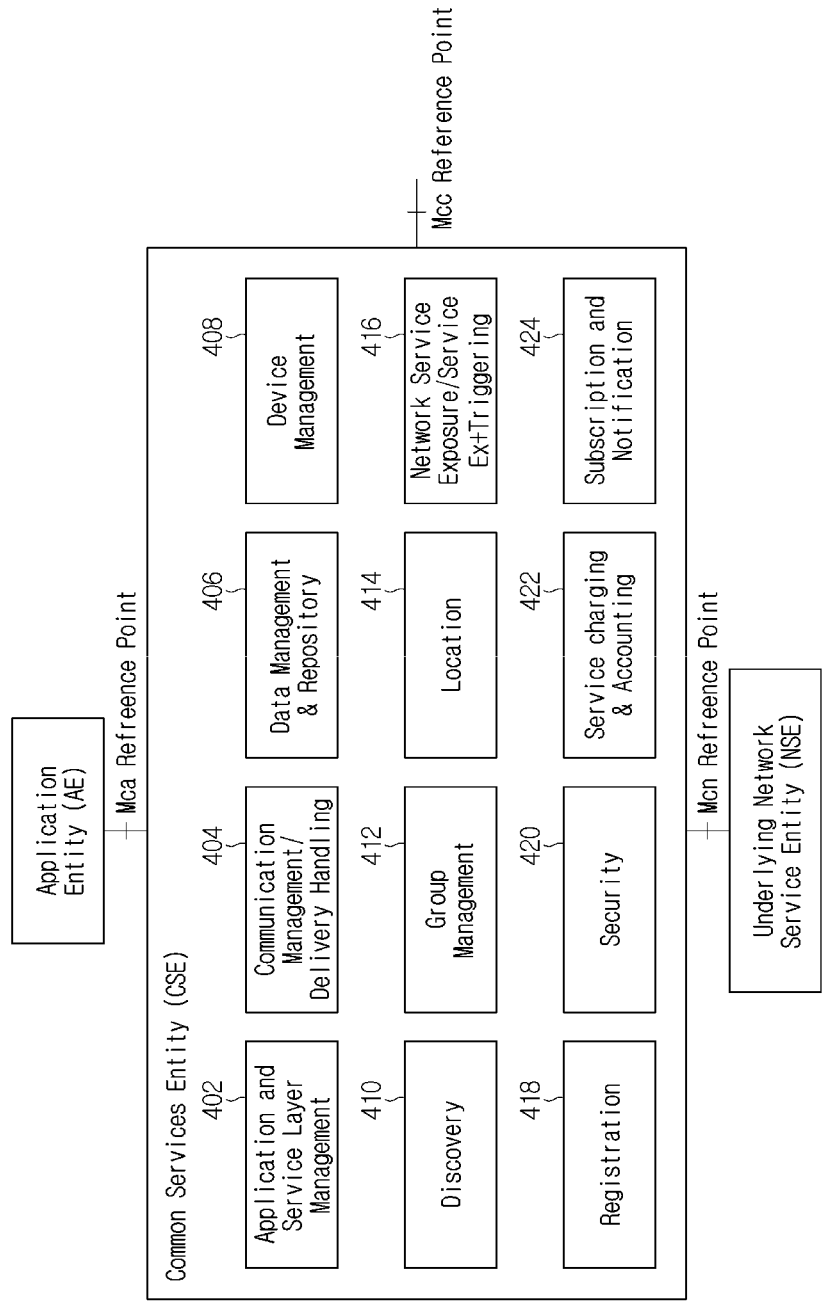
FIG. 4 illustrates a common service function in an M2M system according to the present disclosure.

FIG. 4 is a view illustrating a common service function in an M2M system according to the present disclosure. Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and is not limited to the above-described exemplary embodiment.

The application and service layer management 402 CSF provides management of AEs and CSEs. The application and service layer management 402 CSF includes not only the configuring, problem solving and upgrading of CSE functions but also the capability of upgrading AEs. The communication management and delivery handling 404 CSF provides communications with other CSEs, AEs and NSEs. The communication management and delivery handling 404 CSF are configured to determine at what time and through what connection communications are to be delivered, and also determine to buffer communication requests to deliver the communications later, if necessary and permitted.

The data management and repository 406 CSF provides data storage and transmission functions (for example, data collection for aggregation, data reformatting, and data storage for analysis and sematic processing). The device management 408 CSF provides the management of device capabilities in M2M gateways and M2M devices.

The discovery 410 CSF is configured to provide an information retrieval function for applications and services based on filter criteria. The group management 412 CSF provides processing of group-related requests. The group management 412 CSF enables an M2M system to support bulk operations for many devices and applications. The location 414 CSF is configured to enable AEs to obtain geographical location information.

The network service exposure/service execution and triggering 416 CSF manages communications with base networks for access to network service functions. The registration 418 CSF is configured to provide AEs (or other remote CSEs) to a CSE. The registration 418 CSF allows AEs (or remote CSE) to use services of CSE. The security 420 CSF is configured to provide a service layer with security functions like access control including identification, authentication and permission. The service charging and accounting 422 CSF is configured to provide charging functions for a service layer. The subscription/notification 424 CSF is configured to allow subscription to an event and notifying the occurrence of the event.

Figure 5:
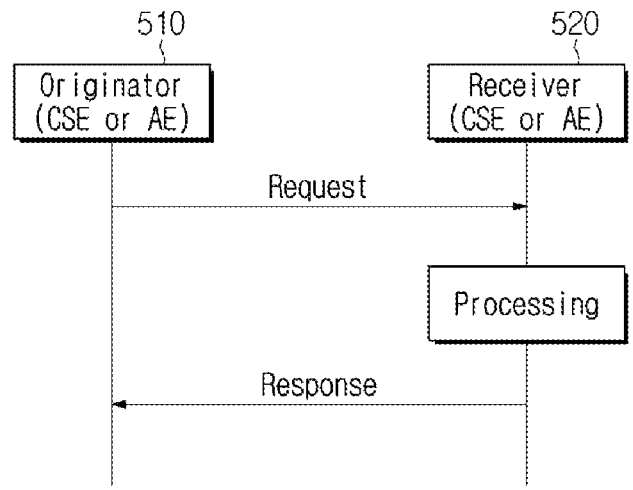
FIG. 5 illustrates a method in which an originator and a receiver exchange a message in an M2M system according to the present disclosure.

FIG. 5 is a view illustrating that an originator and a receiver exchange a message in an M2M system according to the present disclosure. Referring to FIG. 5, the originator 501 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers or gateways, which are described above. In other words, the originator 510 and the receiver 520 may be hardware or software configurations and are not limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete and Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, in response to determining that a parameter is valid and authorized, the receiver 520 may be configured to check whether there is a requested resource and perform processing accordingly.

For example, in case an event occurs, the originator 510 may be configured to transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

Response message parameter/success or not

Response Status Code—successful, unsuccessful, ack
Request Identifier—uniquely identifies a Request message
Content—to be transferred
To—the identifier of the Originator or the Transit CSE
that sent the corresponding non-blocking request
From—the identifier of the Receiver
Originating Time stamp—when the message was built
Result Expiration Timestamp—when the message expires
Event Category—what event category shall be used for
the response message
Content Status
Content Offset
Token Request Information
Assigned Token Identifiers
Authorization Signature Request Information
Release Version Indicator—the oneM2M release
version that this response message conforms to A filter criteria condition, which can be used in a request message or a response message, may be defined as in Table 2 and Table 3 below.

TABLE 2

Matching Conditions

| Condition tag | Multiplicity | Description |
|---|---|---|
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |

TABLE 2-continued

Matching Conditions

| Condition tag | Multiplicity | Description |
| --- | --- | --- |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value 1, label-value2}. Details are defined in [3]. |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentSize attribute of the <contentInstance> matched resource is equal to or greater than the specified value. |
| sizeBelow | 0 . . . 1 | The contentSize attribute of the <contentInstance> matched resource is smaller than the specified value. |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator = Sam", "creator = Sam*", "creator = *Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery.<br>In the case of semantic resource discovery targeting a specific resource, if the semantic description contained in the <semanticDescriptor> of a child resource matches the semanticFilter, the URI of this child resource will be included in the semantic resource discovery result.<br>In the case of semantic query, given a received semantic query request and its query scope, the SPARQL query statement shall be executed over aggregated semantic information collected from the semantic resource(s) in the query scope and the produced output will be the result of this semantic query.<br>Examples for matching semantic filters in SPARQL to semantice descriptions can be found in [i.28]. |
| filterOperation | 0 . . . 1 | Indicates the logical operation (AND/OR) to be used for different condition tags.<br>The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present. |

TABLE 3

| Condition tag | Multiplicity | Description |
|---|---|---|
| | | Filter Handling Conditions |
| filterUsage | 0 . . . 1 | Indicates how the filter criteria is used. If provided, possible values are 'discovery' and 'IPEOnDemandDiscovery'. If this parameter is not provided, the Retrieve operation is a generic retrieve operation and the content of the child resources fitting the filter criteria is returned. If filterUsage is 'discovery', the Retrieve operation is for resource discovery (clause 10.2.6), i.e. only the addresses of the child resources are returned. If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the HostingCSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. . . . /tempContainer/LATEST).This condition applies after all the matching conditions have been used (i.e. a matching result has been obtained). The attribute determines the set of resource(s) in the final filtering result. The filtering result is computed by appending the relative path to the path(s) in the matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

TABLE 4

| | Request message parameter |
|---|---|
| Mandatory | Operation—operation to be executed / CREAT, Retrieve, Update, Delete, Notify |
| | To—the address of the target resource on the target CSE |
| | From—the identifier of the message Originator |
| | Request Identifier—uniquely identifies a Request message |
| Operation dependent | Content—to be transferred |
| | Resource Type—of resource to be created |
| Optional | Originating Timestamp—when the message was built |
| | Request Expiration Timestamp—when the request message expires |
| | Result Expiration Timestamp—when the result message expires |
| | Operational Execution Time—the time when the specified operation is to be executed by the target CSE |
| | Response Type—type of response that shall be sent to the Originator |
| | Result Persistence—the duration for which the reference containing the responses is to persist |
| | Result Content—the expected components of the result |
| | Event Category—indicates how and when the system should deliver the message |
| | Delivery Aggregation—aggregation of requests to the same target CSE is to be used |
| | Group Request Identifier—Identifier added to the group request that is to be fanned out to each member of the group |
| | Group Request Target Members—indicates subset of members of a group |
| | Filter Criteria—conditions for filtered retrieve operation |
| | Desired Identifier Result Type—format of resource identifiers returned |

TABLE 4-continued

| Request message parameter |
|---|
| Token Request Indicator—indicating that the Originator may attempt Token Request procedure (for Dynamic Authorization) if initiated by the Receiver<br>Tokens—for use in dynamic authorization<br>Token IDs—for use in dynamic authorization<br>Role IDs—for use in role based access control<br>Local Token IDs—for use in dynamic authorization<br>Authorization Signature Indicator—for use in Authorization Relationship Mapping<br>Authorization Signature—for use in Authorization Relationship Mapping<br>Authorization Relationship Indicator—for use in Authorization Relationship Mapping<br>Semantic Query Indicator—for use in semantic queries<br>Release Version Indicator—the oneM2M release version that this request message conforms to.<br>Vendor Information |

A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE. An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to create a child resource at a remote CSE, which is not present as a child of an original resource or is not an announced child thereof.

To support resource announcement, an additional column in a resource template may specify attributes to be announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

In an M2M system according to an embodiment of the present disclosure, various IoT devices may perform communication. As the IoT market has evolved to maturity, the IoT technology is expanding its application to enhance people's convenience like other information technologies. We are living in an age where various things at home like TV-setup boxes, washing machines, air conditioners, smart televisions, refrigerators and IP cameras are connected to the Internet and are operated by remote control. As almost everything is connected to the Internet, IoT security is recognized as one of mandatory considerations for both individuals and companies. Measures for keeping the security of IoT devices are required to protect the privacy of information, and using a security key is one of those measures.

A security key may be embedded into a device by a manufacturer or a service provider as early as when the device is being manufactured. Alternatively, a security key may be wirelessly provided to a device. As an example, information (serial number, international mobile equipment identity (IMEI) and the like) of a device itself may be used as a security key. As an example, after a device is completely manufactured, a security key may be received from another wireless device.

IoT devices have their own life spans, and any dead or broken device and part may be replaced for normal operation of an IoT device in an M2M system. In addition, apart from failure or lifespan, devices may be replaced for many other reasons. In this case, as an old device is replaced by a new device, a security key of the old device stored in a server needs to be updated to a security key of the new device. In case IoT security is not maintained while security key information is updated according to replacement or registration of a device, a device, which a user does not want, may be registered to an IoT platform, registered devices may be hacked into, or other problems may occur. Accordingly, the present disclosure proposes a method and apparatus for replacing a security key and maintaining security when an IoT device is replaced and a new device replacing the old one is registered to a server.

As described above, when devices are replaced, it is necessary to change information (e.g., security key, ID) on an old device registered in a server by information on a new device. While information on a registered device is changed, a security key of the registered device may also be replaced by a security key of a new device. Herein, various communication methods may be used to transmit and receive information necessary to replace security keys. As an example, a user may recognize information associated with security key replacement and manually perform a procedure of registering a new device and replacing a security key. As an example, a controller area network (CAN) may be used to exchange information associated with security key replacement between an old device and a new device. As an example, a procedure of exchanging information for replacing a security key is not limited to being performed by a specific means but may be performed by many other various communication means (e.g., UART, USB, Zigbee, WIFI).

As described above, according to various embodiments, information, which is necessary to replace a security key when a device is replaced, may be managed by an IoT platform. A platform for managing security key replacement may interact with an AE operating in an existing old device and an AE operating in a new device which will replace the old device. Information necessary for replacing a security key may include at least one attribute. For example, at least one attribute may include at least one of information on a key (e.g., security key) used for authenticating a device, information (e.g., replacement key) for identifying whether or not a replacement request from a new device, which will replace an old device, is valid, information (e.g., replacement indication, replacement reason) for indicating device replacement, or information (e.g., host device ID) on a host device with an attached device to be replaced. According to an embodiment, information for replacing a security key may include at least one of the attributes described in Table 5 below.

TABLE 5

| Attributes | Description |
|---|---|
| replacementKey | This attribute may check whether or not a request from a new device is valid. In some cases, this attribute may be issued by a server. |
| replacementIndication | This attribute indicates that this message is to indicate device replacement. |
| securityKey | This attribute is a key to be used for authentication of a device. Typically, this key information is given by the manufacturer of a device (e.g., embedded to the device) or provisioned by the service provider. |
| hostID | This attribute is the identifier of a host device to which the replaced device is attached. |

Referring to Table 5, a security key may be replaced using the attribute replacementKey. As the attribute replacementKey is one of the attributes related to security key replacement, a server and a device may confirm, through the attribute replacementKey, that security key replacement is allowed. The attribute replacementKey may be generated by at least one of an old device, a new device or a server. Hereinafter, procedures for replacing a security key will be described.

Figure 6:
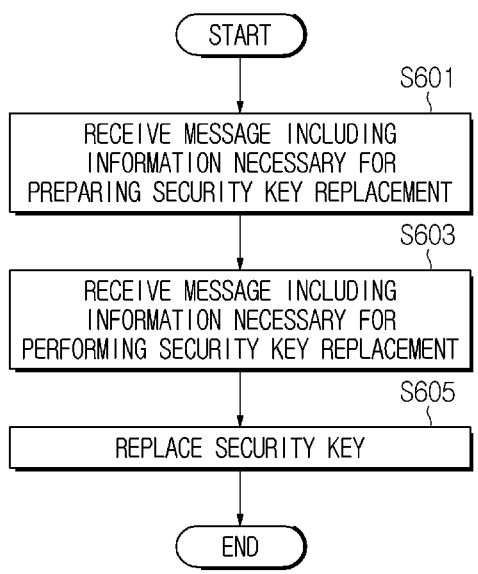
FIG. 6 illustrates an example procedure of replacing a security key in an M2M system according to the present disclosure.

FIG. 6 illustrates an example procedure of replacing a security key in an M2M system according to the present disclosure. The operation subject of FIG. 6 may be an IN-CSE of a device. In the description below, the operation subject of FIG. 6 is referred to as 'device'.

Referring to FIG. 6, at step S601, a device receives a message including information necessary for preparing security key replacement (hereinafter, 'replacement preparation message'). The device may receive the replacement preparation message from at least one of an old device or a new device. The old device is a device already registered in an IoT platform, and the new device is a device to be registered to the IoT platform in replacement of the old device. The information necessary for preparing security key replacement may include at least one of an attribute indicating replacement (e.g., replacementIndication, repIIndication), an attribute notifying a replacement reason (e.g., replacementReason), an identifier (ID) of the new device, an ID of a host device, an attribute indicating a security key (e.g., securityKey), or a uniform resource identifier (URI) of the new device.

At step S603, the device receives a message including information necessary for performing security key replacement (hereinafter 'replacement performance message'). The device may receive the replacement performance message from at least one of the old device or new device. Herein, the replacement performance message may be generated based on a security key replacement indication. The security key replacement indication may be performed based on an ID of the new device, which the old device or the new device transmits, or the attribute 'replacementKey'. According to an embodiment, when the device receives the ID of the new device, which is transmitted by the old device or the new device, the device may determine that a security key replacement procedure is to be implemented, and may perform the security key replacement procedure. As an example, an ID of the new device, which the old device transmits, is identical with an ID of the new device, which the new device transmits, the device may perform the security key replacement procedure. According to another embodiment, when the device receives information including the attribute replacementKey, the device may determine that a security key replacement procedure is to be implemented, and may perform the security key replacement procedure. As an example, in case the device generates and transmits the attribute replacementKey to the old device but receives the attribute replacementKey from the new device, the device may perform the security key replacement procedure. In addition, the information necessary for performing security key replacement may include at least one of information on an ID of the new device, an attribute indicating a security key (e.g., securityKey), an attribute indicating a security key (e.g., securityKey), an attribute notifying a replacement reason (e.g., replacementReason), or an attribute indicating an ID of a host device (e.g., host ID).

At step S605, the device replaces a security key. Based on the message received at step S601 and step S603, the device may replace the security key. As an example, the security key may be replaced by using an attribute (e.g., securityKey) indicating the security key. The device may register a security key of the new device to replace a security key of the old device and may also register other pieces of information of the new device (e.g., ID of the new device, URI of the new device).

Figure 7:
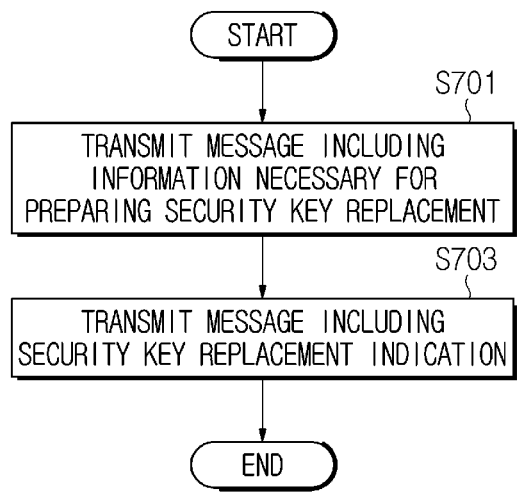
FIG. 7 illustrates an example procedure of preparing replacement of a security key in an M2M system according to the present disclosure.

FIG. 7 illustrates an example procedure of preparing replacement of a security key in an M2M system according to the present disclosure. The operation subject of FIG. 7 may be an AE of an old device or a new device. In the description below, the operation subject of FIG. 7 is referred to as 'device'.

Referring to FIG. 7, at step S701, a device transmits a message including information necessary for preparing security key replacement (hereinafter, 'replacement preparation message'). The information necessary for preparing security key replacement may include at least one of an attribute indicating replacement (e.g., replacementIndication, repIIndication), an attribute notifying a replacement reason (e.g., replacementReason), an identifier (ID) of the new device, an ID of a host device, an attribute indicating a security key (e.g., securityKey), or a uniform resource identifier (URI) of the new device.

At step S703, the device transmits a message including a security key replacement indication (hereinafter, 'replacement indication message'). The security key replacement indication may be performed based on an ID of the new device, which the device transmits, or the attribute 'replacementKey'. According to an embodiment, when the device receives the ID of the new device, which is transmitted by the old device or the new device, the device may determine that a security key replacement procedure is to be implemented, and may perform the security key replacement procedure. According to another embodiment, when the device receives information including the attribute replacementKey, the device may determine that a security key replacement procedure is to be implemented, and may perform the security key replacement procedure.

Figure 8:
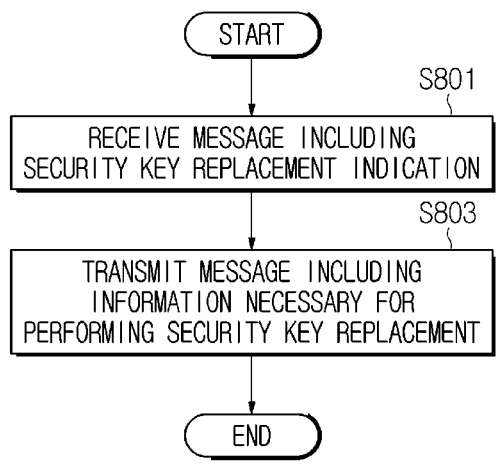
FIG. 8 illustrates an example procedure of starting replacement of a security key in an M2M system according to the present disclosure.

FIG. 8 illustrates an example procedure of starting replacement of a security key in an M2M system according to the present disclosure. The operation subject of FIG. 7 may be an AE of an old device or a new device. In the description below, the operation subject of FIG. 8 is referred to as 'device'.

Referring to FIG. 8, at step S801, a device receives a message including a security key replacement indication (hereinafter, 'replacement indication message'). The security key replacement indication may be performed based on an ID of the new device, which the old device or the new device transmits, or the attribute 'replacementKey'. According to an embodiment, when the device receives the ID of the new device, which is transmitted by the old device or the new device, the device may determine that a security key replacement procedure is to be implemented, and may perform the security key replacement procedure. According to another embodiment, when the device receives information including the attribute replacementKey, the device may determine that a security key replacement procedure is to be implemented, and may perform the security key replacement procedure.

At step S803, the device transmits a message including information necessary for performing security key replacement (hereinafter 'replacement performance message'). The information necessary for performing security key replacement may include at least one of information on the ID of the new device, an attribute indicating a security key (e.g., securityKey), an attribute indicating security key replacement (e.g., securityKey), an attribute notifying a replacement reason (e.g., replacementReason), or an attribute indicating an ID of a host device (e.g., host ID).

Figure 9:
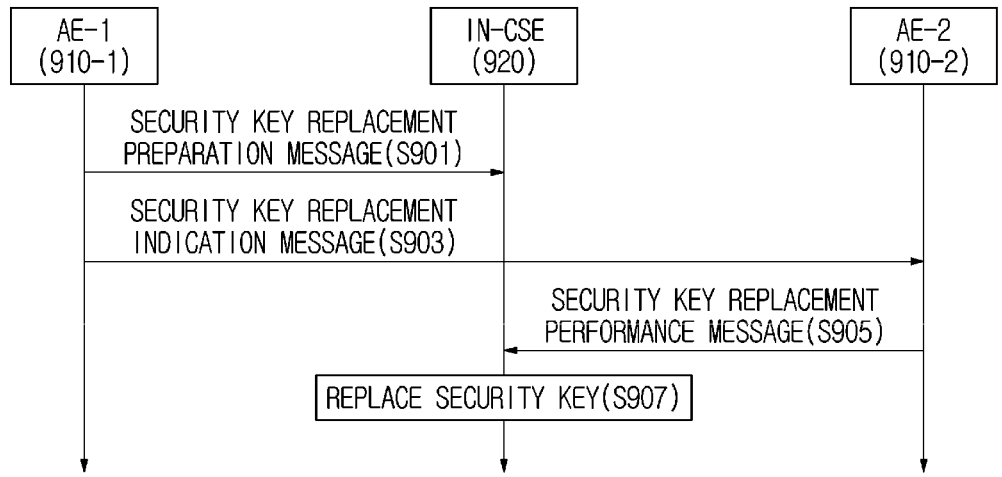
FIG. 9 illustrates an example procedure of replacing a security key by using a new device ID in an M2M system according to the present disclosure.

FIG. 9 illustrates an example procedure of replacing a security key by using a new device ID in an M2M system according to the present disclosure. FIG. 9 exemplifies a signal exchange among AE-1 910-1, IN-CSE 920 and AE-2 910-2. Herein, AE-1 910-1 is an entity representing an old device to be replaced by a new device, and AE-2 910-2 is an entity representing the new device which will replace the old device.

Referring to FIG. 9, at step S901, AE-1 910-1 transmits a security key replacement preparation message to IN-CSE 920. As an example, the security key replacement preparation message may be a message which AE-1 910-1, that is, an old device transmits to IN-CSE 920, which is a server, in order to start a security key replacement procedure, when the old device is to be replaced. The security key replacement preparation message may include information on the old device associated with security key replacement. That is, AE-1 910-1 may transmit a message including information on the old device associated with security key replacement to IN-CSE 920. The information on the old device associated with security key replacement may include an attribute indicating security key replacement (e.g., replacementIndication), an attribute notifying a replacement reason (e.g., replacementReason), an ID of the new device (new device identification), and an attribute identifying a host ID (e.g., hostID). As an example, the ID of the new device may be an identifier specifying that the new device will replace the old device. IN-CSE 920 may store the information on the old device associated with security key replacement, which is received from AE-1 910-1.

At step S903, AE-1 910-1 transmits a security key replacement indication message to AE-2 910-2. The security key replacement indication message is a message by which AE-1 910-1 orders AE-2 910-2 to perform a security key replacement procedure. As an example, the security key replacement indication message may contain an indication that AE-2 910-2 should transmit information associated with replacement of AE-2 910-2 to the IN-CSE.

At step S905, AE-2 910-2 transmits a security key replacement performance message to IN-CSE 920. As an example, the security key replacement performance message may be a message for security key replacement, which the new device AE-2 910-2 transmits to the server IN-CSE 920 in case of device replacement. The security key replacement performance message may include information on the new device associated with security key replacement. That is, AE-2 910-2 may transmit a message including the information on the new device associated with security key replacement to IN-CSE 920. The information on the new device for security key replacement may include an ID of the new device and a security key of the new device. The security key of the new device may be indicated by an attribute (e.g., securityKey) including information on a key used for device authentication.

At step S909, IN-CSE 920 replaces a security key. As an example, IN-CSE 920 identifies whether or not the new device ID received from AE-1 910-1 is identical with the new device ID received from AE-2 910-2. When the new device ID received from AE-1 910-1 is identical with the new device ID received from AE-2 910-2, IN-CSE 920 may update the existing security key information of AE-1 910-1 to the security key information of AE-2 910-2. Herein, AE-2 910-2 may register a security key through URIs. As an example, when the security key information of AE-2 910-2 is updated, the host ID and the new device ID may also be registered together.

An old device, which is a device attached to a host device (a car or a mobile phone), may be replaced by a new device. In this case, it may be important to know that both the old device and the new device are attached devices of the same one host device. Accordingly, in order to indicate the occurrence of replacement of a device attached to one host device, a security key and a replacement key may include an identifier of the host device. As an example, a serial number and identifier of the host device may be a source for generating a security key or a replacement key, and in this case, the security key and the replacement key include the identifier of the host device.

Figure 10:
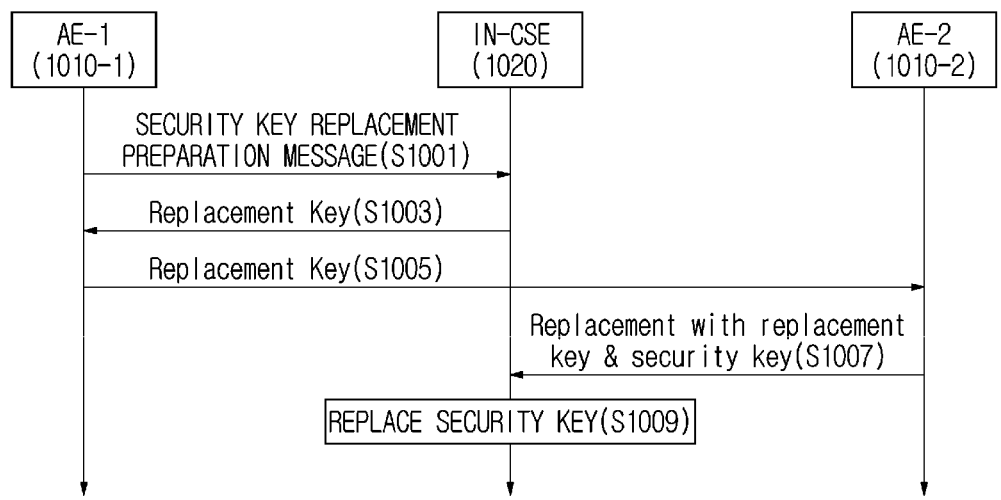
FIG. 10 illustrates an example procedure of replacing a security key by using an attribute related to security key replacement in an M2M system according to the present disclosure.

FIG. 10 illustrates an example procedure of replacing a security key by using an attribute related to security key replacement in an M2M system according to the present disclosure. FIG. 10 exemplifies the exchange of signals among AE-1 1010-1, IN-CSE 1020 and AE-2 1010-2. Herein, AE-1 1010-1 is an entity representing an old device to be replaced by a new device, and AE-2 1010-2 is an entity representing the new device which will replace the old device.

Referring to FIG. 10, at step S1001, AE-1 1010-1 transmits a security key replacement preparation message to IN-CSE 1020. As an example, the security key replacement preparation message may be a message which AE-1 1010-1, that is, an old device transmits to IN-CSE 1020, which is a server, in order to start a security key replacement procedure, when the old device is to be replaced. The security key replacement preparation message may include information indicating security key replacement preparation. That is, AE-1 1010-1 may transmit a message including information indicating security key replacement preparation to IN-CSE 1020. The information indicating security key replacement preparation may include an attribute indicating replacement (e.g., replacementIndication) and an attribute notifying a replacement reason (e.g., replacementReason).

At step S1003, IN-CSE 1020 transmits the attribute replacementKey to AE-1 1010-1. The attribute replacementKey may be an attribute that the server generates to perform a device replacement procedure. The attribute replacementKey may be used to register a security key of the new device to the server. As an example, when receiving the security key replacement preparation message from AE1-1 1010-1, IN-CSE 1020 may generate the attribute replacementKey. IN-CSE 1020 may transmit the attribute replacementKey, which it generates based on the security key replacement preparation message, to AE-1 1010-1.

At step S1005, AE-1 1010-1 transmits the attribute replacementKey to AE-2 1010-2. That is, AE-1 1010-1 may transmit the attribute replacementKey, which it receives from IN-CSE 1020, to AE-2 1010-2.

At step S1007, AE-2 1010-2 transmits a security key replacement performance message to IN-CSE 1020. As an example, the security key replacement performance message may be a message for security key replacement, which the new device AE-2 1010-2 transmits to the server IN-CSE 1020 in case of device replacement. The security key replacement performance message may include information on the new device associated with security key replacement. That is, AE-2 1010-2 may transmit a message including the information on the new device associated with security key replacement to IN-CSE 1020. Information of AE-2 1010-2 for security key replacement may include the attribute replacementKey received from AE-1 1010-1 and information on the security key of AE-2 1010-2 (e.g., securityKey). The information on the security key of AE-2 1010-2 may be indicated by the attribute securityKey.

At step S1009, IN-CSE 1020 replaces a security key. Based on the information of AE-2 1010-2 for security key replacement received from AE-2 1010-2, IN-CSE 1020 may replace a security key. As an example, when the information received from AE-2 1010-2 includes the attribute replacementKey, which IN-CSE 1020 transmitted to AE-1 1010-1, IN-CSE 1020 may replace the existing security key information of AE-1 1010-1 (e.g., securityKey of the old device) by the security key information of AE-2 1010-2 (e.g., securityKey of the new device). As an example, by registering the security key of AE-2 1010-2, IN-CSE 1020 may disconnect the existing registration of the old device and register the new device. As an example, AE-2 1010-2 may be registered as a replacement using uniform resource identifiers (URIs) of AE-1 1010-1.

Figure 11:
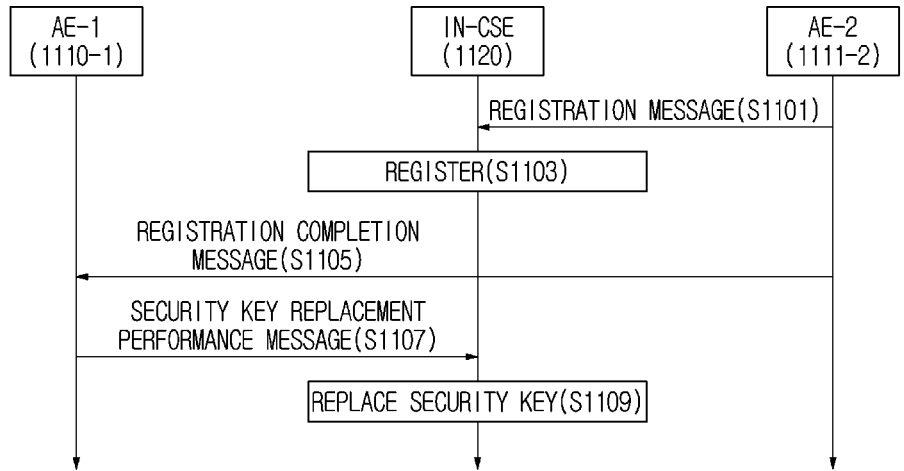
FIG. 11 illustrates an example procedure of replacing a security key by using an attribute related to security key replacement in an M2M system according to the present disclosure.

FIG. 11 illustrates an example procedure of replacing a security key by using an attribute related to security key replacement in an M2M system according to the present disclosure. FIG. 11 exemplifies the exchange of signals among AE-1 1110-1, IN-CSE 1120 and AE-2 1110-2. Herein, AE-1 1110-1 is an entity representing an old device to be replaced by a new device, and AE-2 1110-2 is an entity representing the new device which will replace the old device.

Referring to FIG. 11, at step S1101, AE-2 1110-2 transmits a registration message to IN-CSE 1120. When replacement of a device occurs, the registration message is a message which AE-2 1110-2, which is a new device, transmits to IN-CSE 1120, which is a server, in order to be registered to IN-CSE 1120. The registration message may include a registration request and registration information of AE-2 1110-2. The registration information, which is information for updating a security key, may include an attribute indicating a security key of AE-2 1110-2 (e.g., securityKey), an attribute indicating replacement (e.g., replIndication), an attribute for checking whether or not a security key is replaced (e.g., replKey, replacementKey), and an attribute identifying a host ID (e.g., hostID). As an example, the attribute for checking whether or not a security key is replaced (e.g, replKey, replacementKey) may be generated by AE-2 1110-2.

At step S1103, IN-CSE 1120 registers AE-2 1110-2. That is, IN-CSE 1120 may register the registration information of AE-2 1110-2 based on the registration message received from AE-2 1110-2. IN-CSE 1120 may perform an upcoming security key replacement procedure based on the registration information.

At step S1105, AE-2 1110-2 transmits a registration completion message to AE-1 1110-1. The registration completion message is a message for notifying that AE-2 1110-2 has been registered to the server in replacement of AE-1 1110-1. The registration completion message may include registration information of AE-2 1110-2. As an example, the registration information may include an attribute (e.g., replacementKey) for checking whether or not URIs and security key of AE-2 1110-2 are replaced.

At step S1107, AE-1 1110-1 transmits a security key replacement performance message to IN-CSE 1120. The security key replacement performance message may include information for updating a registered security key of AE-1 1110-1 to a security key of AE-2 1110-2, when AE-1 1110-1 replacing AE-2 1110-2 is registered to IN-CSE 1120. As an example, the security key replacement performance message may include an attribute indicating replacement (e.g., replacementIndication, replIndication), an attribute for checking whether or not a security key is replaced (e.g., replacementKey), a URI of AE-1, a URI of AE-2 1110-2, and attribute indicating a host ID (e.g., hostID).

At step S1109, IN-CSE 1120 replaces a security key. After identifying whether or not the security key replacement performance message received from AE-1 1110-1 is valid, IN-CSE 1120 may perform a security key replacement procedure. As an example, when IN-CSE 1120 receives an attribute for checking whether or not a security key is replaced, which AE-2 1120-2 generates and transmits to AE-1 1110-1, IN-CSE 1120 may determine that the security key replacement performance message is valid, thereby performing a security key replacement procedure. Herein, IN-CSE 1120 may not only replace the security key but also perform an update to information on AE-2 1110-2. As an example, based on the security key replacement performance message received from AE-1 1110-1, IN-CSE 1120 may update the security key of AE-1 1110-1, which is stored in IN-CSE 1120, to the security key of AE-2 1110-2. Herein, IN-CSE 1120 may store both information on AE-1 1110-1 and information on AE-2 1110-2.

Figure 12:
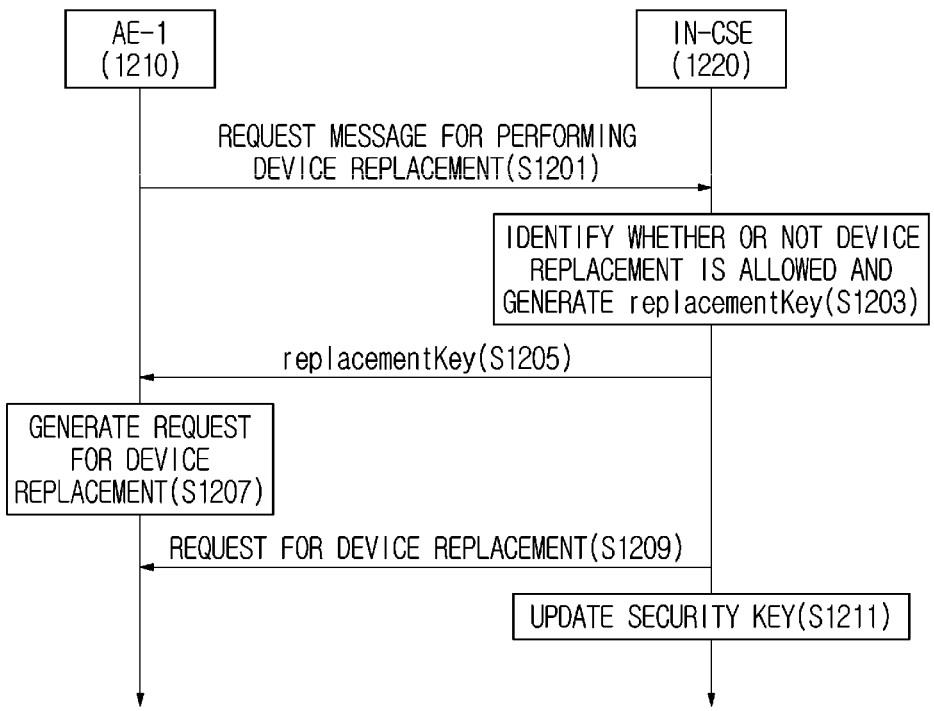
FIG. 12 illustrates an example procedure for replacing a security key in an M2M system according to the present disclosure.

FIG. 12 illustrates an example procedure for replacing a security key in an M2M system according to the present disclosure. FIG. 12 exemplifies the exchange of signals between AE-1 1210 and IN-CSE 1220.

Referring to FIG. 12, at step S1201, AE-1 1210 transmits a request message for performing device replacement to IN-CSE 1220. The request message for performing device replacement is a message for requesting to perform a procedure for modifying information on a device registered in a server when the device is replaced.

At step S1203, when device replacement is valid based on the request message for performing replacement, which is received from AE-1 1210, IN-CSE 1220 generates an attribute (e.g., replacementKey) for checking and indicating whether or not replacement is performed. The attribute replacementKey may be used to replace a device security key. At step S1205, IN-CSE 1220 transmits a message including the attribute replacementKey, which it generates, to AE-1 1210.

At step 1207, AE-1 1210 generates a request message for device replacement based on the attribute replacementKey included in the message received from IN-CSE 1220. The request message for device replacement may include the attribute replacementKey and information on the ID of the new device. At step S1209, AE-1 1210 transmits the request message for device replacement to IN-CSE 1220.

At step S1211, IN-CSE 1220 replaces a security key. When receiving the request message for device replacement from AE-1 1210, IN-CSE 1220 may replace the security key of the old device by the security key of the new device.

Figure 13:
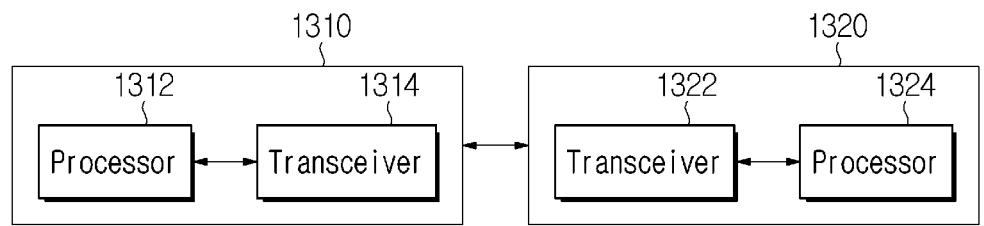
FIG. 13 illustrates a configuration of an M2M apparatus in an M2M system according to the present disclosure.

FIG. 13 illustrates a configuration of an M2M device in an M2M system according to the present disclosure. An M2M device 1310 or an M2M device 1320 illustrated in FIG. 12 may be understood as hardware functioning as at least one among the above-described AE, CSE and NSE.

Referring to FIG. 13, the M2M device 1310 may include a processor 1312 controlling a device and a transceiver 1314 transmitting and receiving a signal. Herein, the processor 1312 may control the transceiver 1314. In addition, the M2M device 1310 may communicate with another M2M device 1320. The another M2M device 1320 may also include a processor 1322 and a transceiver 1324, and the processor 1322 and the transceiver 1324 may perform the same function as the processor 1312 and the transceiver 1314.

As an example, the originator, the receiver, AE and CSE, which are described above, may be one of the M2M devices 1310 and 1320 of FIG. 13, respectively. In addition, the devices 1310 and 1320 of FIG. 13 may be other devices. As an example, the devices 1310 and 1320 of FIG. 13 may be communication devices, vehicles, or base stations. That is, the devices 1310 and 1320 of FIG. 13 refer to devices capable of performing communication and are not limited to the above-described embodiment.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations can be made in the present disclosure without departing from the spirit or scope of the present disclosure as defined by the following claims.

Accordingly, the present disclosure is not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both disclosures may be supplemented as necessary. In addition, the present disclosure has been described with reference to exemplary embodiments thereof. It will be understood by those skilled in the art that various changes in form and details may be made therein without departing from the essential characteristics of the present disclosure. Therefore, the disclosed exemplary embodiments should be considered in an illustrative sense rather than in a restrictive sense. The scope of the present disclosure is defined by the appended claims rather than by the foregoing description, and all differences within the scope of equivalents thereof should be construed as being included in the present disclosure.

What is claimed is:

1. A method for operating a first device in a machine-to-machine (M2M) system comprising a common service entity, the method comprising:
   receiving, from a second device that is an old device comprising a first application entity, a first message including an identifier (ID) of a new device that is to replace the second device and for triggering security key replacement due to device replacement;
   receiving, from a third device that is the new device comprising a second application entity, a third message including an ID of the third device and for performing security key replacement, wherein the third message is generated based on a second message including a security key replacement indication transmitted from the second device to the third device for instructing security key replacement; and
   replacing the security key based on whether the ID of the new device in the first message and the ID of the third device in the third message are identical;
   wherein the first message further includes a first host ID identifying a host device to which the second device is attached;
   wherein the third message further includes a second host ID identifying a host device to which the third device is attached; and
   wherein the replacing of the security key comprises:
      if the new device ID in the first message and the third device ID in the third message are identical, determining, based on the first host ID and the second host ID, whether the second device and the third device are attached to a same host device; and
      if the second device and the third device are attached to the same host device, replace the security key from a first security key of the second device to a second security key of the third device,
      wherein the second host ID is used as a source to generate the second security key of the third device.

2. The method of claim 1, wherein the first message further comprises at least one of an attribute indicating replacement, an attribute notifying a replacement reason, an attribute indicating the first security key, and an attribute for identifying whether or not replacement is performed, and
   wherein the third message further comprises at least one of the attribute for identifying whether or not the replacement is performed, an attribute indicating the replacement, information on a URI of the old device, and information on a URI of the new device.

3. The method of claim 2, wherein the attribute for identifying whether or not the replacement is performed is generated by at least one of the first device, the second device and the third device.

4. The method of claim 2, further comprising:
   transmitting, to the second device, a fourth message that includes the attribute for identifying whether or not the replacement is performed.

5. The method of claim 4, wherein the replacing of the security key comprises, replacing the security key, if the attribute for identifying whether or not the replacement is performed in the fourth message and the attribute for identifying whether or not the replacement is performed in the third message are identical.

6. The method of claim 2, wherein the replacing of the security key comprises, replacing the security key, if the attribute for identifying whether or not the replacement is performed in the first message and the attribute for identifying whether or not the replacement is performed in the third message are identical.

7. A method for operating a second device comprising a first application entity in a machine-to-machine (M2M) system, the method comprising:
transmitting, to a first device comprising a common service entity, a first message including an identifier (ID) of a new device to replace the second device and for triggering security key replacement due to device replacement;
transmitting, to the third device that is the new device comprising a second application entity, a second message including a security key replacement indication,
wherein the security key replacement indication includes the ID of the new device to replace the second device;
wherein the ID of new device is used to determine whether to perform the security key replacement;
wherein the first message further includes a first host ID identifying a host device to which second device is attached;
wherein the second message triggers security key replacement due to device replacement by ordering the third device to transmit, to the first device, a third message including an ID of the third device and a second host ID identifying a host device to which the third device is attached; and
wherein the third message is configured to, upon receipt by the first device, trigger the first device to replace the security key when determining that the new device ID in the first message and the third device ID in the third message are identical and determining, based on the first host ID and the second host ID, that the second device and the third device are attached to a same host device;
wherein a security key of the second device includes the first host ID.

8. The method of claim 7, wherein the first message further comprises at least one of an attribute indicating replacement, an attribute notifying a replacement reason, an attribute indicating the ID of the host device, an attribute indicating a security key, and a URI of the new device, and wherein the security key replacement indication further comprises at least one of an attribute for identifying whether or not the replacement is performed.

9. The method of claim 8, wherein the attribute for identifying whether or not the replacement is performed is generated by at least one of the first device, the second device and the third device.

10. A method for operating a third device comprising a second application entity in a machine-to-machine (M2M) system, the method comprising:
receiving, from a second device that is an old device comprising a first application entity, a second message including a security key replacement indication; and
transmitting, to the first device comprising a common service entity, a third message including an identifier (ID) of the third device and a second host ID identifying a host device to which the third device is attached and for performing security key replacement, wherein the third message is generated based on the security key replacement indication,
wherein the security key replacement indication include an ID of the new device to replace the second device;
wherein the third message is configured to trigger security key replacement by the first device to replace the security key when determining that the new device ID and the third device ID in the third message are identical and that the second host ID in the third message is the same as a first host ID identifying a host device to which the second device is attached; and
wherein a security key of the third device includes the second host ID.

11. The method of claim 10, wherein the security key replacement indication further comprises at least an attribute for identifying whether or not replacement is performed, and
wherein the third message further comprises at least one of an attribute indicating a security key, an attribute indicating security key replacement, an attribute notifying a replacement reason, and the attribute generated by the first device for security key replacement.

12. The method of claim 11, wherein the attribute for identifying whether or not the replacement is performed is generated by at least one of the first device, the second device and the third device.

13. The method of claim 1, wherein a serial number of the host device is used as a source to generate the second security key of the third device.

* * * * *